INVENTOR.
ROY CHESTER JARRETT
RICHARD WILLIAM PATRICK
BY Curtis, Morris & Safford June 3, 1969 R. C. JARRETT ET AL 3,448,248

CARD READER IMPROVEMENT

Filed Sept. 29, 1964 Sheet 2 of 5

INVENTOR.
ROY CHESTER JARRETT
RICHARD WILLIAM PATRICK
BY Curtis, Morris & Safford INVENTOR.
ROY CHESTER JARRETT
RICHARD WILLIAM PATRICK
BY Curtis, Morris & Safford INVENTOR.
ROY CHESTER JARRETT
RICHARD WILLIAM PATRICK
BY Curtis, Morris & Safford INVENTOR.
ROY CHESTER JARRETT
RICHARD WILLIAM PATRICK
BY Curtis, Morris & Safford 3,448,248

CARD READER IMPROVEMENT

Roy Chester Jarrett, Harrisburg, and Richard William Patrick, New Cumberland, Pa., assignors to AMP Incorporated, Harrisburg, Pa.

Filed Sept. 29, 1964, Ser. No. 400,011

Int. Cl. G06c *7/00*

U.S. Cl. 235—61.11 10 Claims

ABSTRACT OF THE DISCLOSURE

A data card reader is disclosed featuring an array of contact springs having the ends thereof disposed in a plane. A drawer having printed circuit conductive paths on the upper surface is mounted for sliding movement inwardly of a housing to carry a card to be read into engagement with the array of contact springs; the contact springs extending through holes in the data card to wipe against conductive paths on the upper surface of the drawer. Drawer movement is limited by a stop containing a leaf spring which is loaded by the last portion of drawer travel inwardly of the reader housing, which spring operates upon cessation of inward movement to displace the drawer a very slight amount in an opposite direction to provide a rewipe of the contact springs against conductive paths, leaving such contacts in a prewiped area.

This invention relates to improvements in multiple switch devices of the type utilized to read punched data cards.

In U.S. application Ser. No. 296,812, filed July 22, 1963 now U.S. Patent No. 3,352,981, there is described a new card reader assembly which employs an angular closure technique to develop a wiping contact under increasing pressure for each possible hole position in standard data cards. The assembly of U.S. Patent No. 3,352,981 has proven highly satisfactory for its intended use with standard card handling and reading equipments. Certain problems have arisen, however, with respect to contact spring alignment during assembly and with respect to use of the unit with low voltage circuits. These problems represent shortcomings found in all known static readers which employ a contact spring or springs for each possible hole position in data cards; e.g., 960 springs for the standard 12 x 80 hole card.

The present invention includes as one object the provision of a mounting means adapted to provide a more constant spring alignment in devices having a relatively large number of contact springs.

It is a further object to provide a multiple contact assembly having a drive adapted to assure an adequate closure of electrical paths in the presence of contaminates, particularly the loose paper fibers known as card dust.

It is yet a further object to provide an improved card reader assembly requiring less maintenance than similar assemblies of the prior art.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention, but are given for purposes of illustration in order that others skilled in the art may fully understand the invention and the principles thereof and the manner of applying it in practical use so that they may modify it in various forms, each as may be best suited to the conditions of a particular use.

The invention to be described overcomes the foregoing problems through an attainment of its objectives by a contact spring array which is self-aligning in assembly and in use and through means adapted to provide a reverse wiping movement of the contact springs to clear such from contaminants so as to assure an adequate engagement of contact surfaces.

This means that the device of the invention can be operated for longer periods of time without adjustment or cleaning. It also means that the device of the invention can be employed with relatively low input and reading voltages without failure, since a good, clean contact surface is assured at each spring position notwithstanding the presence of card fibers or other contaminants found in a card reader environment.

Reference is made to the disclosure of U.S. Patent No. 3,352,981 for a detailed description of the general operation of the assembly of the present invention including the physical arrangement and operation of the reader housing, drawer operation, the contact springs and input and sensing circuits. The invention assembly of this case departs structurally and represents an improvement on U.S. Patent No. 3,352,981 in the several aspects of contact spring mounting and alignment, drawer mounting and drawer drive arrangement.

Figure 1:
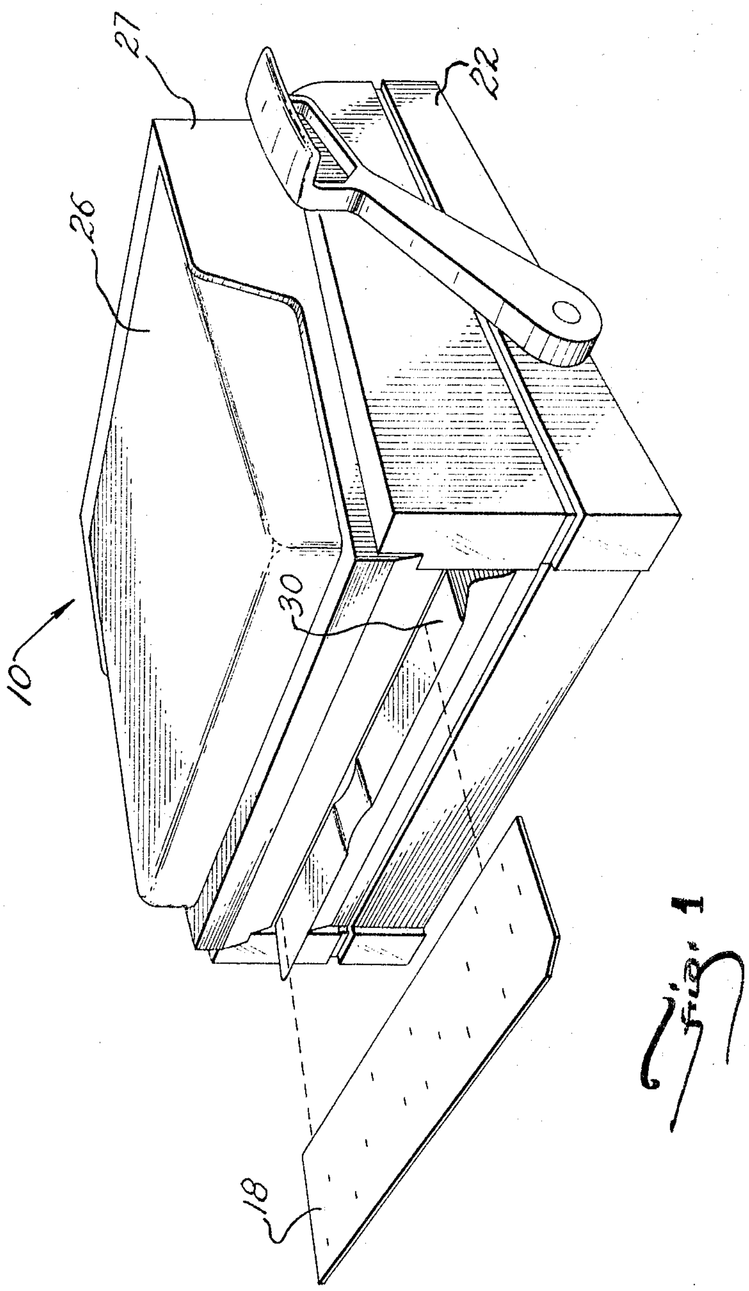
FIGURE 1 is a perspective of the device of the invention shown in a card reader embodiment.
Figure 2:
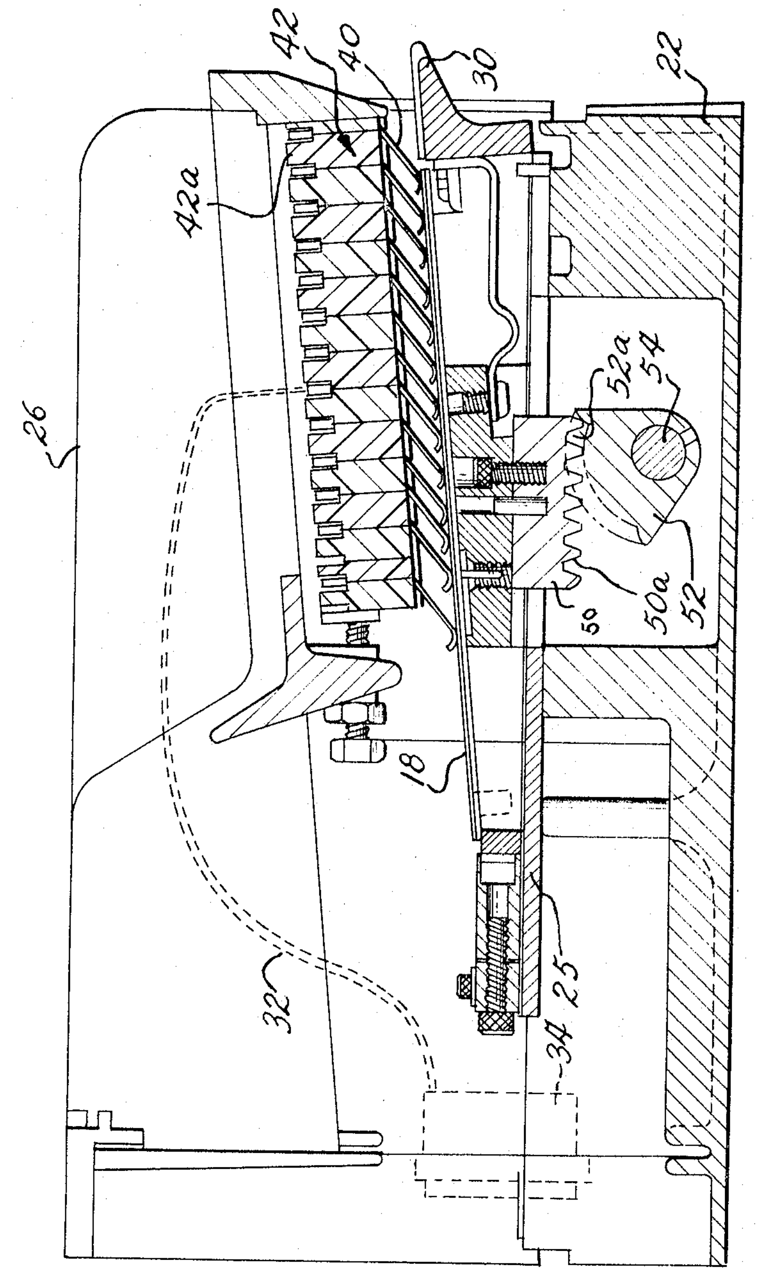
FIGURE 2 is a section of the device of FIGURE 1 showing the contact spring block, drawer and drive mechanism responsible for drawer and contact closure.
Figure 3:
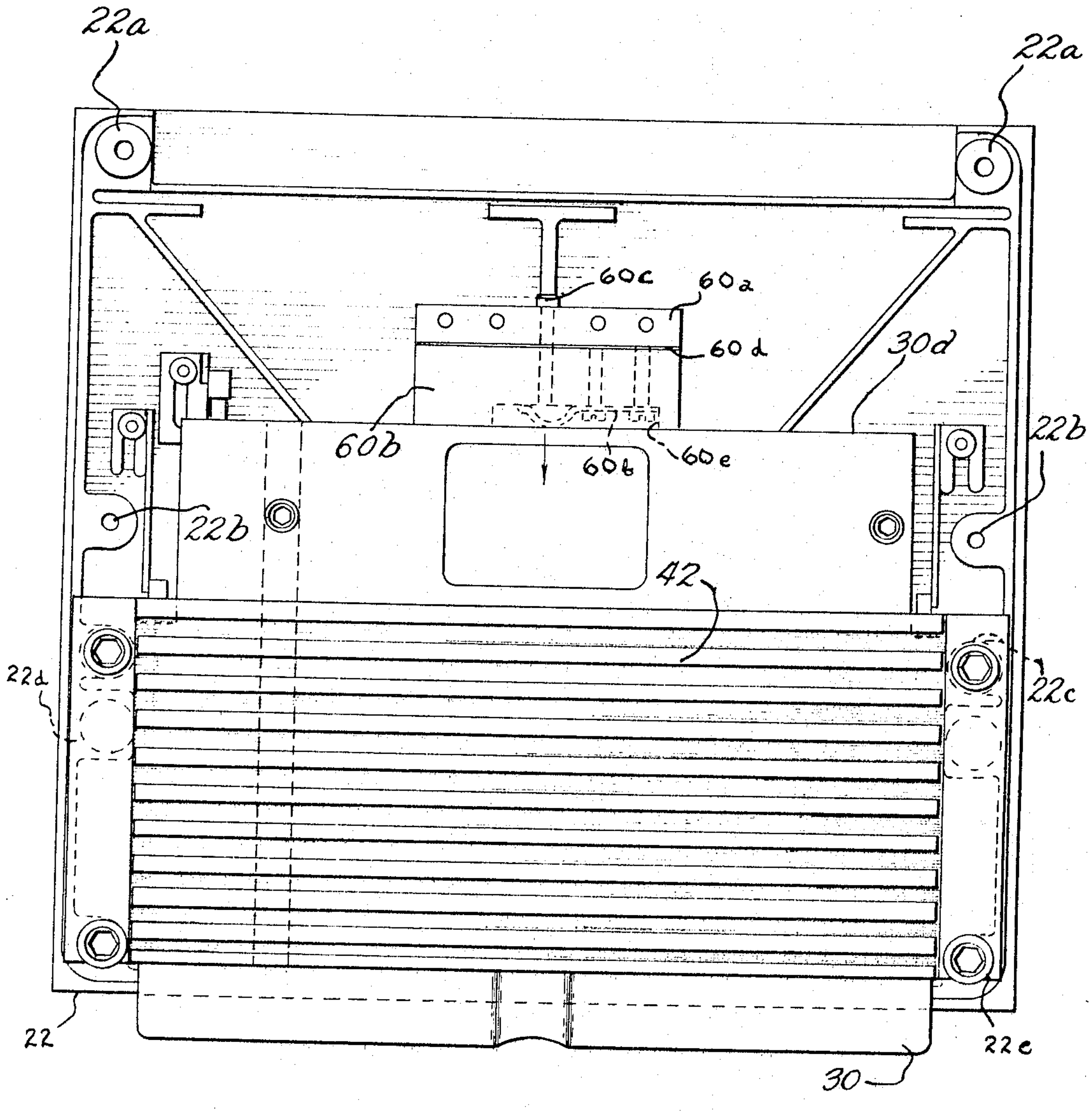
FIGURE 3 is a plan view of the device of FIGURE 1 with the top portion removed.

Turning now to FIGURES 1–3, the assembly 10 is adapted to "read" a card such as 18 positioned on the drawer 30 and held as in U.S. Patent No. 3,352,981 to be driven by operation of handle 28 into closure with contact springs 40 arranged within the assembly and electrically connected by leads such as 32 via a connector 34 to input and output circuitry. After reading, the card is transported outwardly by means of drawer 30 and ejected by means of a spring member in the manner of U.S. Patent No. 3,352,981.

Figure 4:
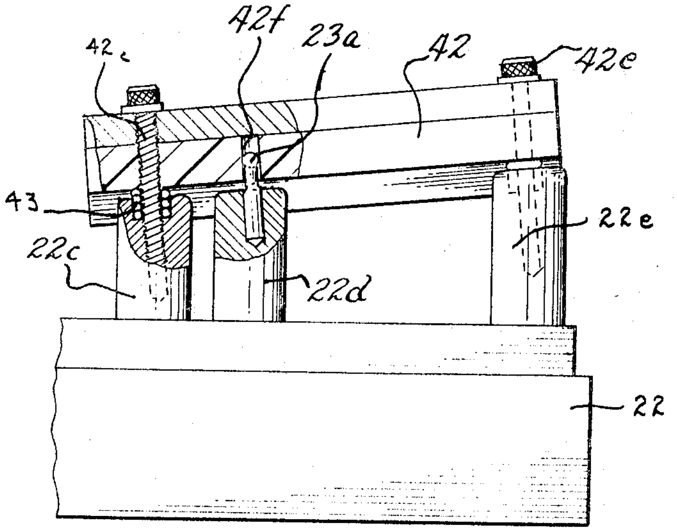
FIGURE 4 is a partial section of the device of FIGURE 1 showing the contact spring aligning mechanism of the invention.

The housing of assembly 10 is preferably formed of light alloy castings including a top or cover 26–27 and a base 22. The base includes vertically extending bosses **22*a* and 22*b*, on either side to receive and support the cover 26–27 through screws threaded into the center of each boss. Three other bosses 22*c*, 22*d* and 22*e* are provided to support and align the spring assembly 42 in a manner which permits the spring ends to be seated on the drawer upper face with the spring ends squarely and evenly contacting such face. The spring assembly 42 is comprised of laminations of plastic blocks 42*a* with rows of springs 40 therebetween, the laminations being bonded or otherwise secured into an integral assembly. At the assembly ends are two screws 42***c* and 42*e* positioned to engage threading centered in bosses 22*c* and 22*e* as shown in FIGURES 3 and 4. Between the lower supporting face of the assembly 42 and the upper supporting face of each boss 22*c* and 22*e* is a compression spring shown as 43 in FIGURE 4. The spring is seated in a relief in the boss face to force the assembly 42 upwardly against the screws 42*c* and 42*e*. The centered boss 22*d* carries a pin 23 anchored therein having a rounded head 23*a* of a diameter to engage the wall surfaces of an aperture 42*f* in assembly 42. The pin 22*d* serves as a positioning means to permit the assembly 42 to be aligned prior to the insertion of screws 42*c* and 42*e*. After such insertion and due to the engagement of 23*a* with 42*f*, the assembly may be pivoted or rocked into a position wherein the contact spring ends are all aligned with respect to the face of the drawer 30. This is preferably accomplished with the drawer closed and with adjustments being made to screws 42*c* and 42*e* for final alignment. In the position of final alignment the assembly 42 is then supported at each end being held against movement parallel to base 22 by pin 23 and by screws 42*c* and 42*e*. Movement of the assembly 42 upward of base 22 is resisted by the heads of screws 42*c* and 42*e* bearing upon the top face of assembly and relative movement downward is resisted by the springs 43.

The foregoing structure permits slight deviations in production of both the casting of base 22, or what has been found to be more likely, the forming of assembly 42 to be readily accommodated. Even deviations wherein the spring members 40 are found to be set at a different angle may be accommodated by adjusting the assembly 42 in its planar position relative to the plane of the upper face of drawer 30. This means that deviations in the planar position of the face of drawer 30 can also be accommodated and that removal and replacement for repair and maintenance of either the spring assembly or the drawer can be accomplished with spring alignment being easily restored. As an important point, the assembly effectively rides against the heads of screws 42*c* and 42*e* in use under the spring pressure of 43 and the assembly is permitted within limits to adjust itself to provide an even seating of the springs on the face of the drawer in use.

The drawer mounting arrangement of the invention assembly also has features to assure proper alignment, ease of assembly and replacement. Viewing FIGURE 5, the base 22 includes a plate 25 secured thereto and positioned to support the drawer 30 for sliding movement transverse to the plane of the drawing. The drawer, which is preferably a lightweight alloy casting, includes a mounting structure comprised of channels 31 and 33 having horizontal and vertical bearing surfaces in engagement with the end and lower edge surfaces of plate 25. Channel 31 is rigidly fixed to drawer 30 by screws as shown and channel 33 is fixed in a vertical sense, but spring loaded in a horizontal sense to press against the opposite plate surfaces. This is accomplished by the structure shown as 35 which includes a bar 35*a* secured to the drawer as shown.

Pin members 35*b* are fixed to the channel 33 and fitted for sliding movement within apertures in the bar 35*a*. Springs shown as 35*c* are positioned on the pin members as in FIGURES 5 and 6 to drive the channel 33 inwardly of 35*a* and permit its forced movement outwardly to allow installation or removal of the drawer on plate 25. With this arrangement the working portion of the drawer is always forceably seated against the channel 31 rather than allowed to float between fixed channels. This assures a proper alignment of the contact paths carried on the drawer face relative to the spring members 40 in assembly 42.

Figure 5:
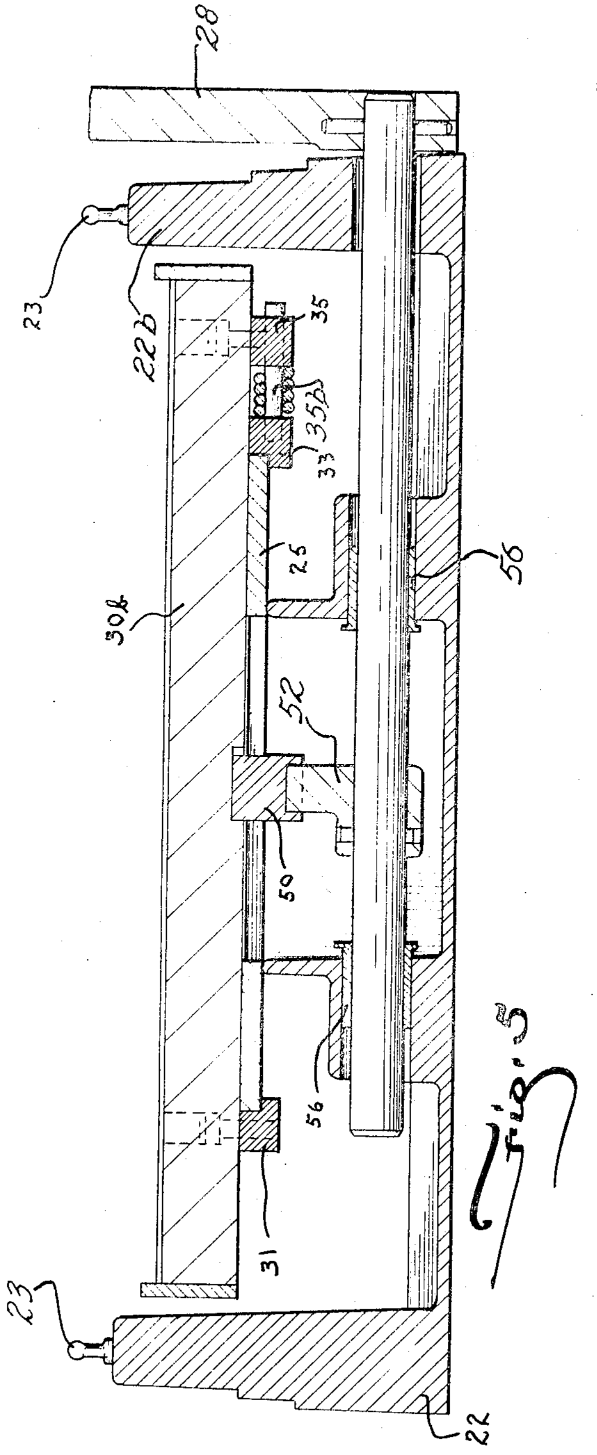
FIGURE 5 is a front elevation, partially sectioned, showing the spring aligning means and a drawer alignment and mounting feature.
Figure 6:
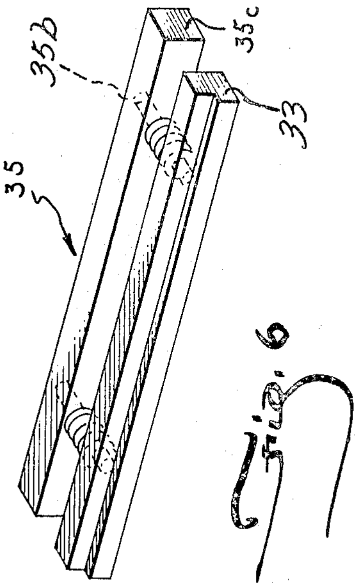
FIGURE 6 is a perspective of part of the drawer alignment and mounting feature.

The drawer drive of the invention employs a rack 50, tied to the bottom of the drawer as shown in FIGURE 2, having teeth 50*a* adapted to be engaged by teeth 52*a* of a gear segment 52 pinned to a shaft 54. The shaft 54 is supported as shown in FIGURE 5 by a pair of bearings 56 and includes an extension pinned to handle 28. Operation of the handle rotates shaft 52 to thus rather exactly drive the drawer in and out of the housing of the assembly.

Figure 7:
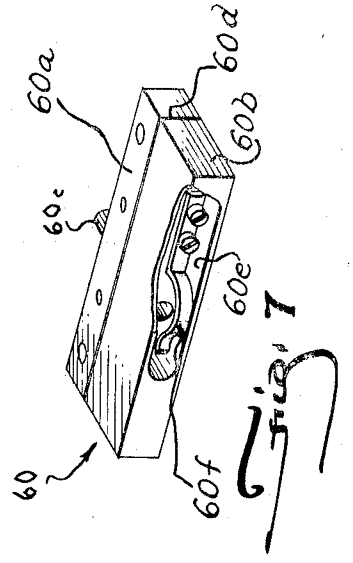
FIGURE 7 is a perspective of the drawer reverse drive means.

Turning now to an important feature of the invention, reference is made to the structure shown as 60 in FIGURES 2, 3 and 7. The member 60 includes a rear block 60*a* adapted to be secured to the rear of plate 25 as shown in FIGURE 2 by screws or other means and a forward block 60*b* spaced and positioned relative to 60*a* by screw 60*c*. A series of shims 60*d* may be employed between the blocks to provide an adjustment of position of 60*b* relative to the drawer 30. Within the forward face of 60*b* is a recess shown as 60*e* and a spring 60*f* secured to the block body as shown in FIGURES 2 and 7. The spring is preferably rounded as shown in FIGURE 3 to define a point of contact and to slightly protrude out of the recess 60*e* when the spring is in its relaxed state. Upon closure of drawer 30 the rear face 30*d* thereof contacts and drives the spring 60*f* inwardly until 30*d* strikes the forward face of block 60*b*; the position shown in FIGURES 2 and 3. At this point the spring 60 is loaded to extend a spring force in a direction to drive the drawer outwardly as shown by the arrow. The block 60 thus serves as a stop to limit the rearward travel of the drawer and to develop a slight opposite or reverse movement thereof following the movement of closure.

Figures 8, 9, 10, 11:
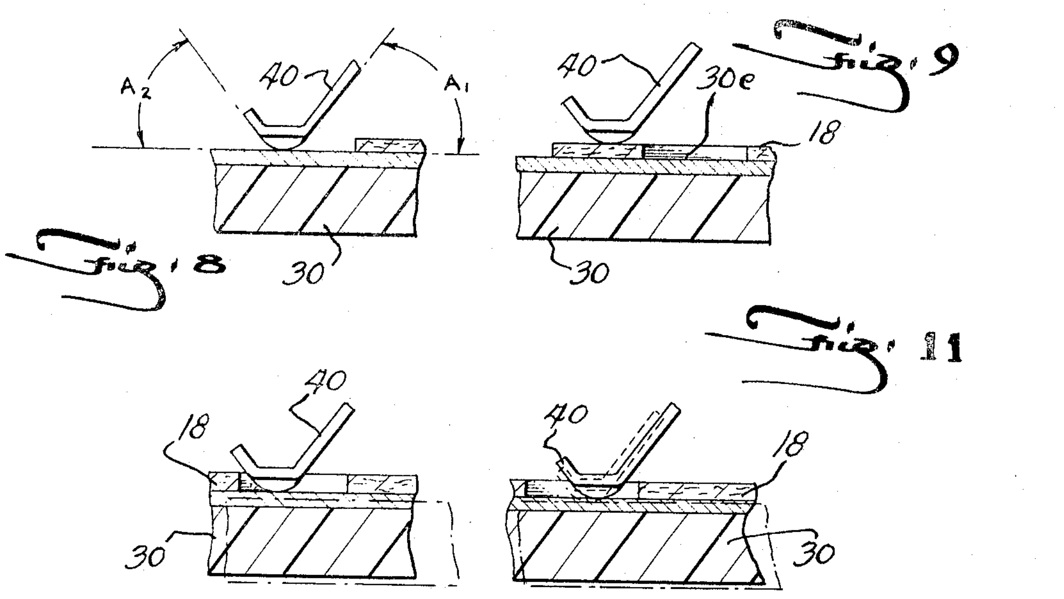
FIGURES 8–11 are enlarged side views of the contact spring in various positions relative to drawer and card movement of closure.

As the drawer 30 is closed to the position of FIGURE 2, the springs 40 engage the upper conductive surfaces 30*e* thereof and wipe in the manner shown in FIGURES 8 and 9 along the conductive paths on such face at the rear of the drawer and on the data card 18 disposed thereon. In the final movement of closure as shown in FIGURES 10 and 11, the springs 40, which find holes in the card, snap downwardly to engage the conductive surfaces of the drawer face and wipe under an increasing spring pressure as the drawer moves to the left and upwardly as described in U.S. Patent No. 3,352,981. With the drawer fully closed and the face 30*d* against the face of block 60*b*, the springs are as shown in FIGURE 11. Release of handle 28 permits the spring 60*f* to drive the drawer outwardly as shown by the dotted line in FIGURE 11 to accomplish a reverse wipe of the contact path established between 40 and 30*e*. The spring characteristics of 60*e* must thus be sufficient to overcome the frictional forces of the springs 40, the channels 31 and 33 in the engagement with plate 25, as well as any force necessary to drive the rack-gear and handle mechanism. Additionally, the characteristics of spring 60*e* must be such as to control the length of the reverse wipe to maintain a substantial contact pressure, remembering that as the drawer is backed off it also drops slightly.

In an actual embodiment of the invention the forward wipe was from 30 to 50 thousandths of an inch and the reverse wipe was controlled to be between 5 and 10 thousandths of an inch. A steel spring was employed which developed about 50 pounds of force in its fully loaded position to accomplish the reverse drive of the drawer.

The reverse wipe feature substantially improves operation of the assembly by maintaining good clear contact surfaces at each spring position. The rounded end surfaces of the springs which heretofore were found on occasion to be held effectively open in low voltage circuit use by card dust, now cooperate with the reverse wipe to clean and roll off of interposed fibers into a firm and wiped engagement with the circuit path of the drawer.

It will have been noted that the invention assembly is arranged so that the basic moving parts which cooperate to make and break the connections necessary for card reading are all positioned and held under spring force. Thus, the drawer 30 is held centered by the spring mechanism 35 and the contact spring assembly 42 is centered and held by springs 43. In closing the drawer face cooperates with the contact springs 40, which are substantially deflected to bear against the face and in the final movement of closure the drawer is driven by spring **60*f***.

The description of the invention is framed in an embodiment adapted to the function of reading data cards, but those skilled in the arts of electrical devices will appreciate the true scope of the invention as now claimed.

What is claimed is:

1. An assembly for reading the holes in tabulating cards including contact springs positioned to engage said card, carriage means to drive said card to effect said engagement including a conductive path means affixed to said carriage means and positioned beneath said card, the carriage means having a travel to effect a first wiping movement of said springs against said conductive path means under spring pressure followed by a second wiping movement in a reverse sense to establish contact in a pre-wiped area of said path means.

2. The assembly of claim 1 wherein said carriage means includes a mounting means holding said conductive paths centered relative to said springs under spring pressure.

3. The assembly of claim 1 wherein said contact springs are carried in a block and secured relative to said carriage means by mounting means holding said block under spring pressure to permit planar pivotal movement relative to said conductive path means.

4. An electrical switch mechanism of the type utilized to make or break multiple circuit paths including in combination a bank of contact springs having the ends thereof disposed in a plane, a planar board member having conductive paths thereon, mounting means to hold said bank of springs including carriage means to drive said board and the said paths in a first direction for a given travel relative to said plane to engage and deflect said springs to effect a first wiping action under contact spring pressure between the spring ends and the board member conductive paths, and further means carried by said mounting means in a position to engage said board member and drive such in a direction opposite to said first direction for a distance which is a small fraction of the given travel so as to effect a second wiping action mounting contact spring pressure between said spring ends and the board member conductive paths to leave the spring ends in a pre-wiped area of contact with the board member conductive paths.

5. The mechanism of claim 4 including means to position and hold a tabulating card on said board member, said contact springs and said board member paths being positioned relative to hole positions in said card to effect a reading thereof responsive to said first and second wiping actions.

6. A card reader including a housing having an array of contact springs secured therein, a drawer member adapted to carry a tabulating card having holes punched therein into and out of said housing, said drawer member having an upper face including conductive paths positioned in alignment with card hole positions, a spring assembly positioned in the path of travel of said drawer whereby the drawer conductive paths are engaged through card holes and wiped a given distance by the springs of said spring assembly, means in the path of drawer travel to limit drawer inward movement, said means including a spring means to drive said drawer outwardly a fraction of said given distance to effect a connection free of card dust in a pre-wiped area of contact.

7. The reader of claim 6 wherein said spring assembly is held in position by means including compressible members permitting a limited pivotal movement of said assembly to accomplish an even seating of the springs thereof on the conductive paths of said drawer.

8. The reader of claim 6 wherein said drawer is adapted for sliding movement in said housing by means of a pair of channels in engagement with a plate means secured to said housing, one of said channels being rigidly fixed to said drawer and the other of said channels being spring loaded against said plate to hold said drawer against the fixed channel in a position of alignment.

9. A card reader of the type adapted to statically read tabulating cards by the closure of contact springs through card holes against a conductive surface including an array of fixed contact springs supported in a housing, a drawer means having conductive paths on the upper surface thereof and adapted to carry a tabulating card thereon, carriage means adapted to drive said drawer inwardly of said housing to drive said card against said springs to cause said springs to bear against and wipe the drawer conductive paths at each card hole position under substantial pressure as said springs are loaded, means secured to said housing to stop inward drawer movement and limit the wipe of said springs, said means including spring means to drive said drawer outwardly of said housing to cause said springs to wipe in an opposite direction the conductive paths at each card hole position under a diminishing spring pressure as said springs are unloaded.

10. The reader of claim 9 wherein said spring means is centered relative to the width of said drawer and contacts said drawer at a single point.

References Cited

UNITED STATES PATENTS

| | | | |
|---|---|---|---|
| 2,830,759 | 4/1958 | Hudes et al. | 235—61.11 |
| 3,308,252 | 3/1967 | Rosen | 200—46 |

DARYL W. COOK, *Primary Examiner.*

U.S. Cl. X.R.

200—46